Patented Feb. 16, 1926.

1,573,056

UNITED STATES PATENT OFFICE.

IVAN GUBELMANN AND JOHN M. TINKER, OF SOUTH MILWAUKEE, WISCONSIN, ASSIGNORS TO THE NEWPORT COMPANY, OF CARROLLVILLE, WISCONSIN, A CORPORATION OF DELAWARE.

PROCESS OF PREPARING 1,8-AMINONAPHTHOL SULPHONIC ACIDS.

No Drawing.   Application filed May 9, 1925.   Serial No. 29,215.

*To all whom it may concern:*

Be it known that we, IVAN GUBELMANN and JOHN M. TINKER, both citizens of the United States, and both residing at South Milwaukee, county of Milwaukee, Wisconsin, have jointly invented certain new and useful Improvements in a Process of Preparing 1,8-Aminonaphthol Sulphonic Acids; and we do hereby declare that the following is a full, clear, and exact description of the same.

This invention relates to the preparation of 1,8-aminonaphthol sulphonic acids by the fusion with caustic alkalies of 1-naphthylamine sulphonic acids which contain a sulphonic acid group in the 8-position.

The ordinary fusion with caustic alkalies of 1-naphthylamine sulphonic acids containing a sulphonic acid group in the 8-position constitutes a well-known method by which 1,8-aminonaphthol sulphonic acids are generally prepared on a technical scale. We have found that by following methods in use heretofore considerable decomposition takes place, through the splitting off of ammonia, resulting in the formation as an impurity of 1,8-dihydroxynaphthalene sulphonic acid. This decomposition not only lowers the yield but also causes the presence of undesirable impurities in the finished product.

The present invention, therefore, has for an object the production of 1,8-aminonaphthol sulphonic acids by an improved method in which the fusion of 1-naphthylamine sulphonic acids which contain a sulphonic acid group in the 8-position is carried out with the least possible decomposition, resulting in excellent yields and a high quality of finished product.

Other and further important objects of this invention will be apparent from the disclosures in the following description, which sets forth the preferred form of our invention.

We have found that the fusion with caustic alkalies of the 1-naphthylamine sulphonic acids proceeds very much more smoothly in the presence of ammonia. The presence of ammonia introduced prior to the caustic alkali fusion prevents almost entirely the splitting off of ammonia formed by the decomposition of the amino groups in the 1,8-naphthylamine sulphonic acids used. We prefer to operate with ammonia pressures of from 75–150 lbs., but higher or lower pressures may be employed if desired. Without limiting our invention to any particular procedure, the following examples are given, as illustrating the application of our improved method in a preferred form:

*Example 1.*—Charge into a steel autoclave 400 lbs. water, 500 lbs. caustic soda and 500 lbs. caustic potash. Heat until dissolved and then charge 1000 lbs. of 1-naphthylamine-4,8-disulphonic acid, as the mono-sodium salt. The autoclave is closed and ammonia gas is pressed into the autoclave up to a pressure of 100–150 lbs. The autoclave is then heated to 190–200° C., where it is held for a period of from 3–4 hours. After releasing the ammonia pressure on the autoclave, the finished fusion is worked up by the well-known method of dissolving in water and acidifying to precipitate the product. The resulting 1,8-aminonaphthol-4 sulphonic acid, commercially known as S-acid, is of very high quality and the yields obtained are excellent. The chemical formula for S-acid is

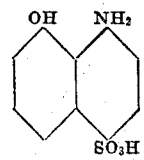

*Example 2.*—Charge into a steel autoclave with 400 lbs. water, 1000 lbs. caustic potash and 1000 lbs. 1-amino-2,4,8-naphthalene trisulphonic acid in the form of its tri-soda salt (either as the free amino or as the sultam compound). The autoclave is closed and ammonia is pressed into it up to a pressure of 100–150 lbs. The temperature of the mass is raised to 160–165° C. and maintained at that temperature during 3–4 hours. After releasing the pressure, the fusion is worked up by dilution and acidification in the usual way. After filtering and drying the precipitate, very pure 1,8-aminonaphthol-2,4-disulphonic acid is obtained in the form of the mono sodium salt;

this product is commercially known as SS-acid, or 2S-acid. The chemical formula for 2S-acid is

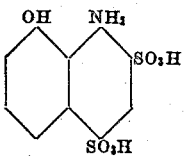

*Example 3.*—Charge an autoclave with 1000 lbs. water, 1000 lbs. caustic soda and 1000 lbs. 1-naphthylamine-3,6,8-trisulphonic acid in the form of the di-sodium salt. After complete solution of the charged material, the autoclave is closed and 200 lbs. of 29% aqueous ammonia is added. The temperature of the mixture is gradually raised to 173—176° C. and maintained at that temperature for 2-3 hours. After releasing the pressure, the fusion mass is worked up by the usual methods, consisting of diluting, acidifying, filtering off the precipitate, and drying the same. This end product is a very pure, 1,8-aminonaphthol-3,6-disulphonic acid in the form of its mono-sodium salt, commercially known as H-acid. The chemical formula for H-acid is

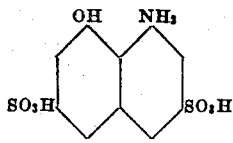

If the various 1,8-aminonaphthol sulphonic acids made by the foregoing examples are analyzed, it will be found that the amount of 1,8-dihydroxynaphthalene sulphonic acid present as impurity is practically nil, which fact clearly demonstrates the value of the ammonia pressure used in our fusion method. The presence of ammonia prevents the splitting off of the amino-group in the 1-naphthylamine sulphonic acids, thereby causing higher yields and a distinctly improved quality of the finished product to be obtained.

We are aware that numerous details of the process may be varied through a wide range without departing from the spirit of this invention, and we do not desire limiting the patent granted other than as necessitated by the prior art.

We claim as our invention:

1. The method of preparing 1,8-aminonaphthol sulphonic acids and salts, which consists in fusing 1-naphthylamine sulphonic acids and salts containing a sulphonic acid group in the 8-position with caustic alkalies in the presence of ammonia.

2. The method of preparing 1,8-aminonaphthol-4 sulphonic acid, which includes the fusion with caustic alkalies of 1-naphthylamine-4,8-disulphonic acid in the presence of ammonia.

3. The method of preparing 1,8-aminonaphthol-2,4-disulphonic acid, which includes the fusion with caustic alkalies of 1-naphthylamine-2,4,8-trisulphonic acid in the presence of ammonia.

4. The method of preparing 1,8-aminonaphthol sulphonic acids, which consists in fusing 1-naphthylamine sulphonic acids containing a sulphonic acid group in the 8-position with caustic alkalies under ammonia pressure.

In testimony whereof we have hereunto subscribed our names.

IVAN GUBELMANN.
JOHN M. TINKER.